INVENTORS
WALTER G. GIBSON AND
ALFRED C. SCHROEDER
BY [signature]
ATTORNEY

INVENTORS
WALTER G. GIBSON AND
ALFRED C. SCHROEDER
BY
[signature]
ATTORNEY

Oct. 18, 1960 W. G. GIBSON ET AL 2,957,042

VIDEO SIGNAL COMPENSATION

Filed May 25, 1956 3 Sheets-Sheet 3

INVENTORS
WALTER G. GIBSON AND
ALFRED C. SCHROEDER
BY [signature]
ATTORNEY

United States Patent Office 2,957,042
Patented Oct. 18, 1960

2,957,042
VIDEO SIGNAL COMPENSATION

Walter Gold Gibson, Princeton, N.J., and Alfred Christian Schroeder, Huntington Valley, Pa., assignors to Radio Corporation of America, a corporation of Delaware Filed May 25, 1956, Ser. No. 587,360
9 Claims. (Cl. 178—7.1)

The invention relates to television systems, and it particularly pertains to circuit arrangements for compensating for loss of detail due to the finite dimensions of scanning electron beams and/or the leakage over the target electrodes, and/or for optical aberrations in such systems.

Because of the finite dimensions of the image signal producing and image reproducing electron beam spots there is appreciable loss of detail in image reproduction by the electronic television scanning process. In particular, because the scanning spot is of finite size, the light intensity over an appreciable area of the image is averaged so that all fine detail within this area is effectively suppressed. Thus the television system acts as though it were an ideal system with a low pass filter attenuating the finer detail, or the higher frequency components by which that detail is conveyed. Since there are two scanning spots, one at the image signal producing end and one at the image reproducing end, the total filtering action in the overall system is the equivalent of two separate filters in tandem.

Electronic television image signal producing tubes also exhibit a "leakage" effect over the target electrode whereby image information of an elemental picture area is also picked up as a component of the image signal from nearby elemental areas. In a sense each elemental area affects every other elemental area of the target electrode to some degree; the degree becoming less with distance.

Accordingly for good detail in the reproducing image, it is important to compensate for the filtering and leakage effects. In black-and-white television as used in entertainment broadcasting today, the image orthicon tube is almost universally used and almost universally operated "over the knee" of the characteristic curve representing the performance of the tube. This type of operation tends to produce good "edge effects" in the black-and-white signal whereby the loss of detail due to the finite size of the electron beam and leakage is less noticeable than it would otherwise be. In both black-and-white and color television systems using photoconductive tubes, such as the vidicon, however, there is little or none of the "edge sensitivity" characteristic found in the image orthicon. Therefore it is especially desirable with vidicon tubes, and the like, to compensate for loss of detail due to leakage. In color television systems, edge sensitivity is not obtainable with the image orthicon either because it must be operated over a more linear portion of the characteristic curve for good color signal. Therefore it is even more advantageous in color television broadcasting to compensate for loss of detail due to the finite dimensions of the scanning spot, leakage and for aberrations of the optical system.

A number of systems using electric filters have been designed and used to compensate for loss of detail in the direction of line scanning, which is usually in the horizontal direction and shall be so construed hereinafter. This compensation in the direction of line scanning is quite frequently termed "aperture compensation" by the artisan since the disturbing effect is analogous to optical aberrations in photographic systems. Arrangements have been suggested for compensating for loss of detail in the direction normal to line scanning, which is usually the vertical direction and shall be so construed hereinafter, but these arrangements have required signal delays of the order of time required to scan an entire field.

In interlaced scanning systems, one of which is standard for U.S. television broadcasting, the necessity for delays of the order of field scanning time has retarded the use of compensation in the vertical direction because of the complexity of the apparatus required. For the latter reason, "spot wobbling" and "focus wobbling" systems have found little favor and the inherent necessity of correcting video signals at the camera, or other source, is further discouraging.

An object of the invention is to provide an improved and simplified system for compensating for the loss of detail due to the finite dimension of the scanning spot in electronic television systems.

Another object of the invention is to develop video signals for use in a television system in which an image is reproduced in successive fields having interlaced lines so as to compensate for loss of detail in the vertical direction.

A further object of the invention is to develop video signals for use in a transmission system so as to compensate for loss of detail in both the vertical and horizontal directions.

Still another object of the invention is to provide color television signals enabling image reproduction of the same detail as presently possible in black-and-white systems.

According to the invention described in an application of O. H. Schade, Sr. Serial No. 773,439, filed November 12, 1958, and assigned to the same assignee as the subject application, the loss in detail in the vertical direction in an interlaced system is minimized by effectively compensating the information derived from the scanning of each raster line by information derived from the scanning of one or more raster lines adjacent the raster line under consideration and in the same field therewith. In a basic arrangement of the Schade invention the compensation of the video signal is accomplished by delaying information obtained in the line previous to the line under consideration in the same field of the raster for a time substantially equal to the time required to scan one line and the delayed signal is then combined with the undelayed signal in predetermined polarity and magnitude, to produce the desired compensated video signal in suitable form for controlling the operation of an image reproducing device.

In another illustrative embodiment of the Schade invention, the compensation of the video signal comprises delaying or storing two different signal components. One of the stored signals is delayed for time substantially equal to the time required to scan one line and the second signal is delayed for additional time substantially equal to that required to scan one line. The two delayed signals are then combined with the undelayed video signal in predetermined polarity and magnitude to produce the compensated video signal. More specifically, in the exemplary embodiment of the invention, there is in addition to the signal delaying means, apparatus for inverting, or reversing the polarity of one or more of the signals with respect to the other, or erect, signal and then attenuating or decreasing in magnitude the inverted signals to form secondary signals before combining with the erect, or main, signal.

According to the present invention the loss of detail in both the horizontal and vertical directions is minimized by attenuating the higher frequency components of the secondary signals to effectively provide a peaking of these high frequency components. In the exemplary embodiments of the invention, such peaking is readily obtained by means of simple low pass filtering means interposed in the apparatus for developing the secondary signals. The attenuation of the higher frequency components effected by the low pass filter, is in effect inverted when the secondary signals are effectively subtracted from the main signal due to the reversal by the inverting means.

It should be understood that apparatus according to the invention may be embodied in the transmitting or receiving apparatus with equal effect. In most cases, it is probably preferable to incorporate the invention in the transmitter since in this manner, the advantages of the invention accrue to the televiewer using existing receiving apparatus without requiring any changes therein.

In order that the invention may be readily put to use and the advantages thereof fully realized, several embodiments of the invention are described hereinafter, by way of examples only, with reference to the accompanying drawing in which.

Figures 1, 2, 3A:
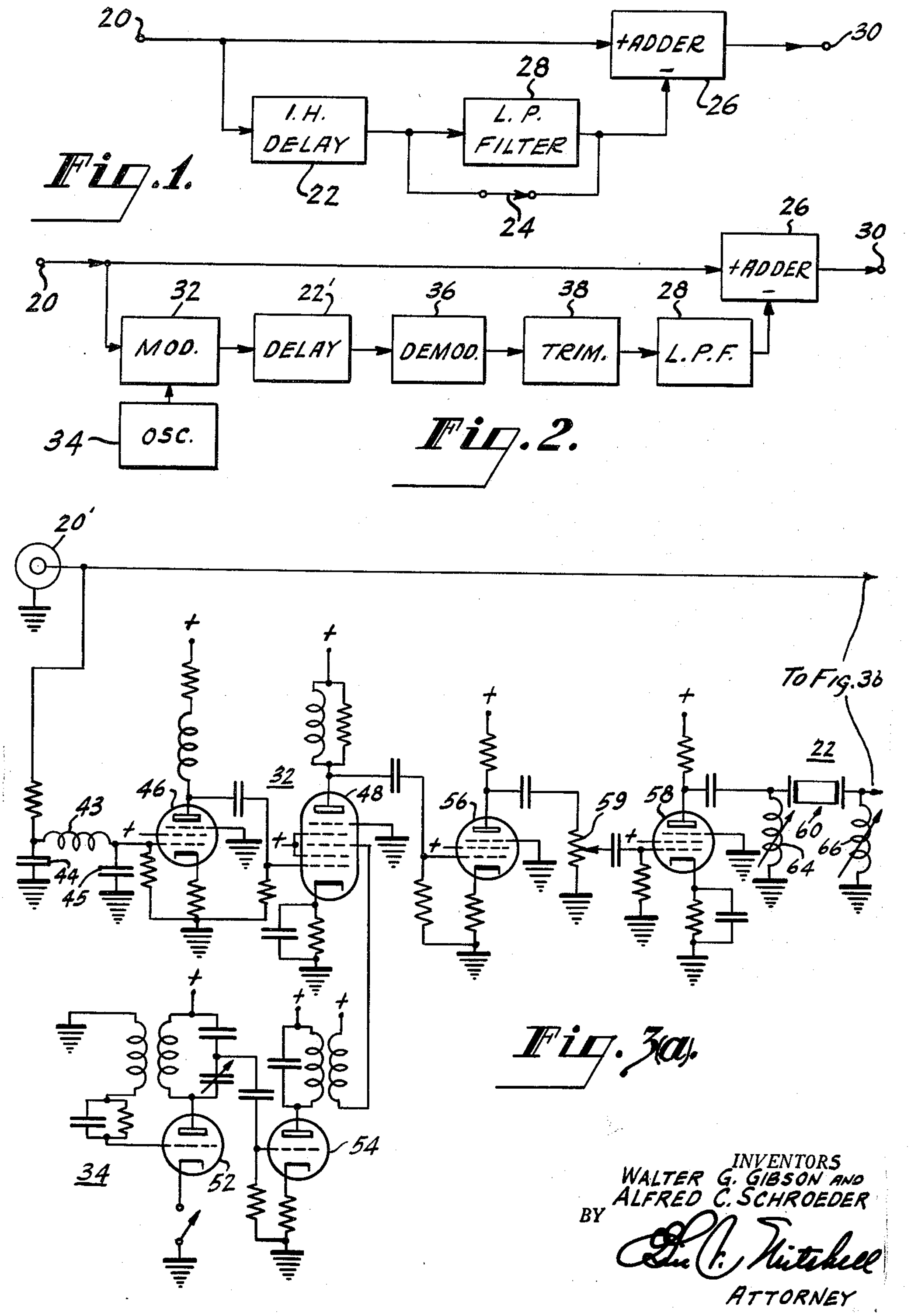
Fig. 1 is a functional diagram of a basic embodiment of the invention.
Fig. 2 is a functional diagram of a practical embodiment of the invention.
Figure 4:
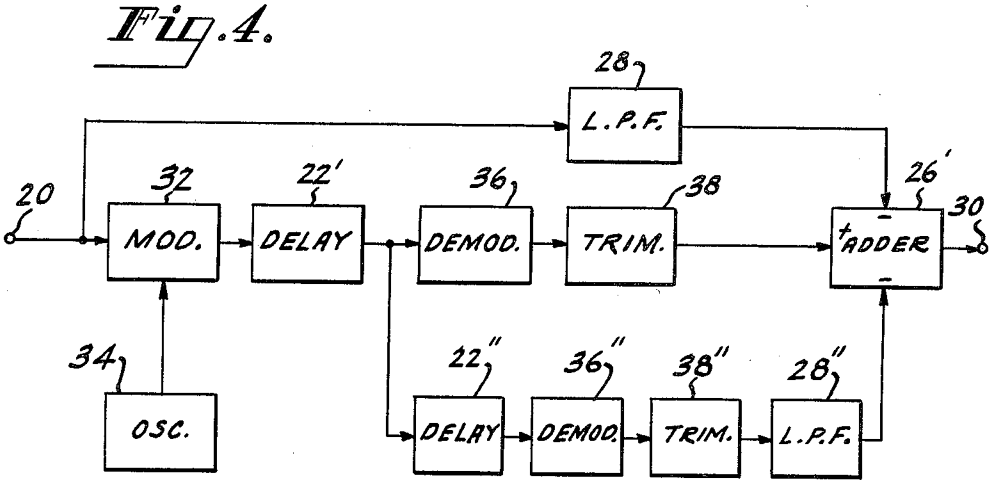
Figure 3B:
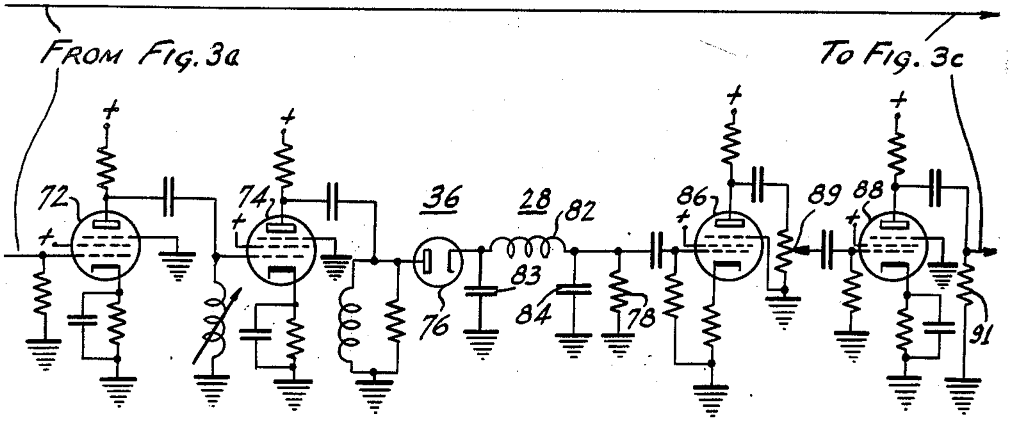
Figure 3C:
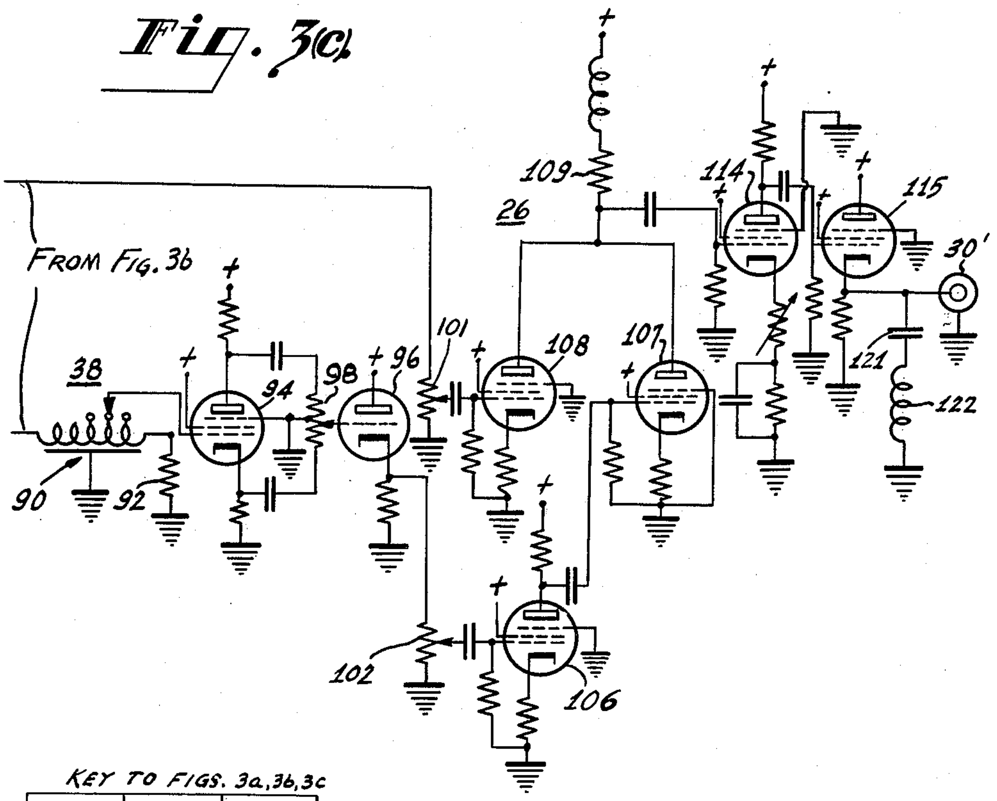

Fig. 3*a*, 3*b* and 3*c* are schematic diagrams of circuitry for performing the functions outlined in Fig. 2;

Fig. 4 is a functional diagram of a further embodiment of the invention; and

Figure 5:
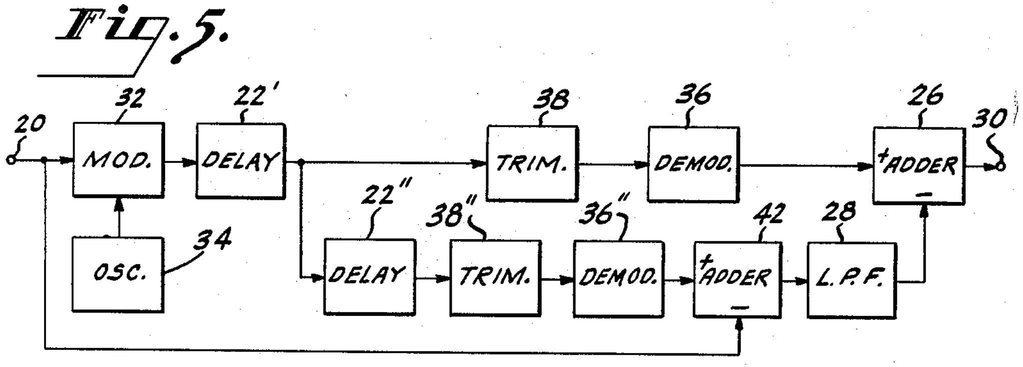
Figure 6:
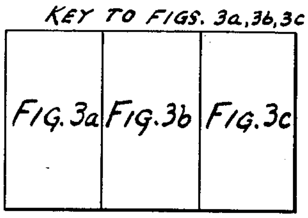

Fig. 5 is a functional diagram of an alternate embodiment of the invention illustrated in Fig. 4. Fig. 6 is a key to Figs. 3*a*, 3*b* and 3*c*.

Before describing the invention in detail, reference is made to the copending U.S. patent application Serial No. 525,648, filed August 1, 1955, for Picture Signal Compensation Apparatus, by Alda V. Bedford, now issued as U.S. Patent No. 2,757,236, describing the manner in which vertical aperture loss arises in television systems.

With the general nature of the problem in mind, reference is made to Fig. 1 of the instant application. Here are shown the components of that part of a television system necssary to develop the compensated video signals in accordance with the fundamental principles of the invention. Since the invention may be embodied in apparatus either at the transmitter or at one of the receivers, specific reference to either type of apparatus will be avoided. Video signals from a suitable source—such as a camera, or other pickup device, used at a transmitting station or the video signal demodulating portion of a television receiver, or other image reproducing apparatus—are applied at video signal input terminals 20. In any case, the video signals applied at the input terminals 20 are conventional and of the type which may be impressed upon an image reproducing device in successive fields to form a raster having interlaced horizontal lines. A delay device 22 is coupled to the input terminals 20 to delay the video signals for a time period substantially equal to that required to scan one line of the raster. The character of the delay device, in so far as the broad aspects of the invention are concerned is immaterial. If desired, it may be formed of lumped inductive and capacitive reactance circuit elements to constitute a conventional delay network. It is only necessary that a delay, including any delay inherent in the remainder of the circuitry, of the order of 63.5 microseconds be obtained over a frequency range of zero to as high as four mc./s. under present standards without undue frequency discrimination. The output of the delay device is applied through a lead containing a switch 24 to one terminal of a combining, or algebraic adding, circuit 26, and the undelayed video signals appearing at the input terminals 20 are applied to another terminal of the combining circuit 26. Essentially, the combining circuit 26 comprises means for effectively subtracting a portion of the delayed video signal obtained from the delay device 22 from the undelayed signals appearing at the input terminals 20 to produce a compensated video signal at the compensated video signal output terminals 30. It is contamplated that the combining circuit 26 comprises components for attenuating the delayed video signal in a predetermined manner and for inverting the delayed video signal with respect to the erect video signal appearing at the input terminals 20. Suitable attenuating components are well known to those skilled in the art, as are suitable polarity reversing devices, such as conventional controlled electron flow path device. The remainder of the combining device 26 may comprise a combining circuit of the type embodied in conventional television transmitters for adding video, blanking and synchronizing signals. In the arrangement of Fig. 1 as thus far described a portion of the information obtained at a given point in one line of a raster is subtracted from the information obtained at the corresponding point in the succeeding line of the same field of that raster to produce at the output terminals 30 a modified video signal which is compensated suitably to overcome the loss of detail due to the finite size of the scanning spot and the like, or as popularly termed the "effective aperture loss," in the vertical direction. Also, as thus far described, the invention is that described and claimed in the application Serial No. 773,439, filed November 12, 1958, for Otto H. Schade, Sr. and assigned to the assignee of the present invention.

According to the present invention the compensated video signal at the output terminals 30 is corrected for loss of detail in the horizontal direction by passing the delayed video signal from the output of the delay device 22 through a low pass filter 28; with the switch 24 open. The low pass filter 28 effectively attenuates the higher frequency components of the delayed video signals and when the delayed and filtered signals after appropriate attenuation are subtracted from the undelayed signals in the combining device 26, the high frequency components are effectively peaked. Peaking is effected by the increase in ratio of the high frequency components to the low frequency components brought about by subtracting the low frequency components from the signal in the combining device 26.

The delay of one line is equivalent to peaking at an intermediate frequency of the video signal band. Although prior art teaching is to the effect that peaking is more important at the uppermost limits of the band, it has been found that better results are obtained with peaking beginning at much lower frequencies. Good results have been obtained in practice with peaking starting at very low frequencies and reaching substantially a maximum as low as one-eighth of the highest frequency in the band and continuing substantially at that level for the remainder of the band. The low pass filter may be in conventional form comprising inductive and capacitive reactance elements. The cutoff frequency of the filter 28 depends on the scene televised, the type of camera used, and/or the conditions under which a given scene is televised with a given cutoff frequency can be varied for optimum compensation.

A number of delay devices suitable for the purpose are known in the art, among which are magnetic tape and wire recording systems, lumped capacitance-inductance networks, mercury column, and the graphechon type of cathode ray tube described in the above identified copending application, Serial No. 525,648 or any other storage type tube. Another delay device suitable for the purpose is the quartz crystal storage and delay device which is advantageous in that it is compact despite the fact that it does require some, but relatively simple, auxiliary circuitry for operation.

In Fig. 2 there is shown a functional diagram of a circuit modified to accommodate a quartz crystal delay device 22'. The video signal appearing at the input terminals 20, which ranges in frequency from zero to four mc./s. is applied to a modulating circuit 32 to which a locally generated sine wave obtained from an oscillating circuit 34 is also applied to produce a signal of suitable frequency range for application to a crystal delay device 22'. The delayed video signal is restored to the original frequency range of 0–4 mc./s. by means of a demodulating circuit 36 which may be of conventional form. If the quartz crystal delay device 22' is cut to provide a delay of exactly one line the signal at the output video demodulating circuit 36 may be directly applied to the low pass filter 28. However, in practice it is often desirable to cut the quartz crystal device 22' to delay the signal for a time slightly less than that required to scan one horizontal line, say for 62.0 microseconds and additional delay of adjustable nature is obtained by interposing a trimming delay device 38 in the circuit. Since the maximum delay of the trimming delay device 38 need be only of the order of a few, say 1.5, microseconds, conventional inductance-capacitance networks are entirely suitable. The trimming delay device 38 may follow the demodulating circuit 36, however, it should be understood that if desired the trimming delay device may be interposed anywhere between the modulating circuit 32 and the demodulating device 36. It should also be understood that it is entirely within the realm of possibility that the total delay of the quartz crystal delay device 22' may be made adjustable over a final few microseconds range.

A schematic diagram of circuitry for performing the functions outlined in Fig. 2 is shown in Figs. 3*a*, 3*b* and 3*c*. Fig. 6 by rectangles provides a key to Figs. 3*a*, 3*b* and 3*c*. Turning first to Fig. 3*a*, the video signal appearing at the video signal input terminals 20' is applied by way of an isolating and amplifying stage comprising a filter 43—45 and a pentode vacuum tube 46 to the control grid of a pentagrid mixing tube 48. The injection grid of the mixing tube 48 is supplied with a sine wave signal obtained from a source comprising an oscillator tube 52 and an amplifier tube 54. The filter 43—45 is tuned to parallel resonance at the oscillator frequency to prevent energy at that frequency from affecting the main signal at the input terminals 20'. The output of the mixing tube 48 is amplified by a pair of impedance matching and amplifying circuits comprising a pair of pentode tubes 56, 58 connected in cascade to a suitable level which may be adjusted by a potentiometer 59 for application to the input of the quartz crystal delay device 22 comprising a fuzed quartz bar fitted with quartz crystal transducers on each end to form an ultrasonic delay line and a pair of shunt input and output reactors 64, 66. The delayed signal across the output inductor 66 is fed to the circuits of Fig. 3*b*. Here the delayed signal is amplified in a stage comprising a plurality of vacuum tube circuits of the type incorporating amplifier tubes 72 and 74 for presentation to the demodulating circuit 36 comprising a diode detector element 76 and a load element 78. Preferably the low pass filter 28, comprising a series inductor 82 and a pair of input and output shunt capacitors 83 and 84, is interposed between the diode 76 and the load resistor 78. If compensation in the vertical direction only is desired, the low pass filter comprising the elements 82—84 may be omitted entirely. The delayed and filtered video signal is then applied through the intermediary of an amplifier stage comprising triode tubes 86, 88, and including an attenuator 89, to the input terminals of the trimming delay device 38 as shown in Fig. 3*c* in the form of an adjustable delay line 90 which is terminated by a resistor 92. The delayed and filtered video signal is then applied through amplifying stages comprising a pentode tube 94 and a triode cathode follower 96 to the combining circuit 26. The combining circuit 26 comprises an erect signal attenuating potentiometer 101 across which the undelayed video signal appearing at the input terminals 20' is applied and a delayed and filtered signal attenuating potentiometer 102 across which the signal appearing in the cathode circuit of the cathode follower 96 is applied. The arms of the potentiometers 101, 102 are adjusted to provide the apportioning between the signals required for the desired compensation. With the secondary signal taken from the anode side of the potentiometer 98, the delayed and filtered video signal is applied to an inverting tube 106 and the inverted signal is then applied to a combining tube 107 having a load element 109 connected in common with another combining tube 108. It should be clearly understood, of course, that an odd number of signal inverting amplifier stages would provide the inversion for the proper application of the signal to the combining circuit, or alternately that the arm of the potentiometer 98 could be thrown to the cathode side of the potentiometer, so that no "special" inverting tube is required. Because of the inversion of the delayed signal in the inverting tube 106 the signal appearing at the anode of the combining tube 107 is effectively subtracted from the undelayed video signal appearing at the anode of the other combining tube 108. The compensated video signal appears across the output load element 109 and is applied to the amplifying and impedance matching stages comprising triode tubes 114 and 115. The compensated signal appearing in the cathode circuit of the output tube 115 is presented at the compensated video signal output terminals 30'. A series circuit comprising a capacitor 121 and inductor 122 having values resonant at the local oscillator frequency is provided to remove any remaining signal of that frequency.

The degree of compensation, or the attenuation of the secondary signal, may be determined approximately by mathematical analysis of some complexity once certain fundamental assumptions are determined. In practice, however, the apparatus under consideration, that is the image orthicon, vidicon, or other pickup device and/or associated equipment, is difficult to analyze for the fundamental assumptions. Therefore, a strictly empirical approach is both satisfactory and realistic. In practice, complete elimination of interfering effects is probably not possible and in some instances not even desirable. For example, it may be desirable to soften the image to some degree. Actually it is desirable to be able to change the degree of compensation with the scene to be televised, with the type of camera used, and with the conditions under which a given scene is televised with a given camera, and so on.

The embodiments of the invention illustrated in Figs. 2 and 3 serves to compensate the signal developed for the line under consideration by subtracting pertinent information obtained from the line previously scanned in the same field. By interchanging the connections between the combining circuit and the source of signals, the compensating signal can be derived from the succeeding line, if desired. More effective results are obtained according to the invention, however, with a circuit arrangement as shown in Fig. 4 which further compensates the signal for the line under consideration by also subtracting a portion of the signal obtained from the succeeding line to be scanned in the same field. In this arrangement a combining circuit 26' is arranged as will be apparent to those skilled in the art to subtract two secondary signals from the main signal. The main signal in this case is constituted by the erect signal obtained after a delay of one line, while the secondary signals comprise a first signal obtained from the input terminals and another secondary signal obtained after an additional delay of one line. The additional delay is provided by a further quartz crystal delay device 22'' having the input circuit thereof connected to the output circuit of the initial quartz crystal delay device 22', a demodulating circuit 36'', a trimming delay circuit 38'', and a low pass filter 28'' interposed in series between the quartz crystal delay device 22' and the combining circuit 26'. A further low pass filter 28' is connected between the input terminals 20 and the combining circuit 26' for peaking in the horizontal direction. The additional components required for the circuit arrangement of Fig. 4 may be constructed in the same manner as those shown in Fig. 3.

Where the main signal is passed through a quartz crystal delay device as in the embodiment shown in Fig. 4, the full bandwidth must be translated without frequency discrimination. In such operation the local oscillator must provide a wave of frequency sufficiently high to assure full bandwidth. A frequency of three times the highest frequency of the main signal should be adequate.

If desired the same results as obtained with the arrangement of Fig. 4 may be obtained with a single low pass filter as shown in Fig. 5. In this arrangement the secondary signals are derived from the input terminals 20 and the demodulating circuit 36'' and combined in a combining circuit 42 after which the combined secondary signal is applied to a single low pass filter 28. The combining circuit 42 may be of the same type as shown in Fig. 3 for the combining circuit 26.

If desired additional compensation may be obtained according to the invention by incorporating additional delay devices to compensate for loss of detail by taking into account the elemental areas of a line preceding and succeeding the line under consideration by two lines in the same field, three lines in the same field and so on. This may be accomplished without difficulty by those skilled in the art from the foregoing teaching. It is suggested that such compensation may better be made by adding one or more of the secondary signals from the main signal instead of subtracting all of the secondary signals as previously described. The phase splitting arrangement connected between the amplifier tube 94 and the cathode follower tube 96 permits adding or subtracting at will and may be used to determine the attenuation as well, eliminating the need for the potentiometer 102.

While those skilled in the art will determnie the component values for the applications of the invention with which they are concerned, the values listed below which were employed in a video signal compensating circuit as shown in the schematic diagram of Fig. 3, are provided as a guide to the practice of the invention.

| Ref. No. | Component | Type or Value |
|---|---|---|
| 43 | Filter inductor | 182 μh. |
| 44 | Filter capacitor | 91 mmf. |
| 45 | Filter capacitor | 82 mmf. |
| 46 | Isolating and amplifying tube | 6AC7. |
| 48 | Mixing tube | 6SB7. |
| 52 | Oscillator tube | t/s 6SN7. |
| 54 | Oscillator's amplifying tube | t/s 6SN7. |
| 56 | Amplifying and isolating tube | 6AC7. |
| 58 | Amplifying tube | 6AH6. |
| 60 | Delay crystal | 62.0 μsec. |
| 64 | Adjustable inductor | 5–15 μh. |
| 66 | Adjustable inductor | 10–20 μh. |
| 76 | Demodulator diode | 1N54A. |
| 78 | Demodulator load | 1 kilohm. |
| 82 | Filter inductor | 182 μh. |
| 83 | Filter capacitor | 91 mmf. |
| 84 | Filter capacitor | 82 mmf. |
| 88 | Amplifier tube | 6AC7. |
| 89 | Adjustable delay line | 0–0. 25 μsec. |
| 90 | Input resistor | 200 ohms. |
| 91 | Terminating resistor | 200.0 O. |
| 92 | Terminating resistor | 200.0 O. |
| 94 | Amplifying tube | 6AC7. |
| 96 | Impedance matching tube | 6AG7. |
| 106 | Inverting tube | 6AC7. |
| 107, 108 | Mixing tubes | 6AC7. |
| 114 | Amplifying tube | 6AC7. |
| 115 | Cathode follower | 6AG7. |

The local oscillator 34 was tuned to 5.7 mc./s. and the cutoff frequency of the low pass filter 28 was 1.75 mc./s. The power supply delivered 250 volts positive with respect to ground.

The invention claimed is:

1. In a television system including, a source of video signals and in which said video signals are to be impressed subsequently upon an image-reproducing device in successive fields having interlaced parallel lines, apparatus to compensate for loss of detail in both the direction of said lines and a direction perpendicular to said lines, said apparatus comprising means coupled to said video signal source for delaying said signals for a time substantially equal to that required to scan one line, means coupled to said delaying means for attenuating the higher frequency components of said delayed signal, and a signal combining circuit coupled to said video signal source and to said attenuating means for subtracting said delayed signal from said undelayed signal to produce a compensated video-signal for subsequent impression upon said image-reproducing device.

2. In a television system including, a source of video signals and in which said video signals subsequently are to be impressed upon an image-reproducing device in successive fields having interlaced parallel lines, apparatus to compensate for loss of detail in the direction of said lines and in a direction perpendicular to said lines, said apparatus comprising, means coupled to said video signal source for delaying said signals for a time substantially equal to that required to scan one line, means coupled to said delaying means for attenuating the higher frequencies of the delayed signal output of said delaying means, means coupled to said attenuating means for reversing the polarity of the delayed and attenuated signal output of said attenuating means, and means coupled to said video signal source and to said polarity reversing means for combining the output of said last named means and the undelayed signal output of said video signal source to produce a compensated video signal for subsequent impression upon said image-reproducing device.

3. In a television system including, a source of video signals and in which said video signals are subsequently to be employed to reproduce an image in successive fields having interlaced horizontal lines, apparatus to compensate for loss in detail in both the horizontal and vertical directions, said apparatus comprising means including a signal storage device coupled to said video signal source for delaying said signals for a time substantially equal to that required to scan one line, means coupled to said signal storage device for delaying the delayed signal output thereof for an additional time substantially equal to that required to scan one line, means coupled to said video signal source and to said last named signal delaying means for reversing the polarity of and attenuating the delayed signal output of said last named signal delaying means and the undelayed signal output of said video signal source, means coupled to said polarity reversing and attenuated means for further attenuating the higher frequency components of said attenuated signals and means coupled to the said first named signal delaying means and to said further attenuating means for arithmetically adding the signal outputs thereof to produce a compensated video signal for image reproduction.

4. In a television system in which signals including, information representative of a subject are produced by effectively scanning said subject in successive fields in interlaced substantially parallel raster lines by an electron beam of finit size and in which said signals are subsequently impressed upon an image-reproducing device operated in a manner to form an image raster of substantially parallel lines, apparatus to compensate for loss in detail in the direction of the lines and in a direction substantially perpendicular to said lines due to the finite size of said electron beam, said apparatus including means for producing by scanning said raster lines first individual signal components representative of the brightness information of successively scanned picture areas in a given one of said raster lines and second individual signal components representative of the brightness information of successively scanned picture areas in a raster line adjacent to said given raster line in the same field, means for attenuating the higher frequency components of said second individual signal components. and means for effectively combining said first and second individual signal components in such polarity and magnitude as to produce a compensated subject representative signal for subsequent impression upon said reproducing device.

5. In apparatus to compensate for loss in detail in the vertical direction in a television system including a source of video signals by which to reproduce an image in successive fields having interlaced horizontal lines, means coupled to said video signal source for delaying said signals for a time substantially equal to that required to scan one line, said means comprising a storage device having input and output circuit reactance requiring relatively high frequency excitation, means for heterodyning the video signals from said source to the frequency band acceptable by said device, said device having characteristics at which to delay the transfer of the heterodyned signals by substantially the time required to scan one line, means coupled to the output of said device for recovering the video signals in the original frequency band, means coupled to said recovering means for attenuating the higher frequency components of said recovered video signals, and means coupled to said source and to said attenuating means for combining said video signals in predetermined polarity to produce a compensated video signal for subsequent impression on an image reproducing device.

6. In apparatus to compensate for loss in detail in both the horizontal and vertical directions in a television system including a source of video signals by which to reproduce an image in successive fields having interlaced horizontal lines, means coupled to said video signal source for delaying said signals for a time substantially equal to that required to scan one line, said means comprising a delay device having input and output circuit reactance requiring relatively high frequency excitation, means for heterodyning the video signals from said source to the frequency band acceptable by said device, said device being arranged to delay the transfer of the heterodyned signals by substantially the time required to scan one line, means coupled to the output of said device for recovering the video signals in the original frequency band, means coupled to said recovering means for attenuating the higher frequencies of said recovered video signals, and means coupled to said source and to said attenuating means for combining said video signals in predetermined magnitude and polarity to produce a compensated video signal for subsequent impression on an image reproducing device.

7. In apparatus to compensate for loss in detail in both the horizontal and vertical directions in a television system including a source of video signals by which to reproduce an image in successive fields having interlaced horizontal lines, means for delaying signals for a time substantially equal to that required to scan one line, means coupled to said delaying means for further delaying said signals for a time substantially equal to that required to scan one line, each of said means comprising a quartz crystal storage delay device having input and output circuit reactance requiring relatively high frequency excitation, and being cut to delay the transfer of the heterodyned signals by substantially the time required to scan one line, means coupled between said video signal source and said first named delaying means for heterodyning the video signals from said source to the frequency band acceptable by said devices, respective means coupled to the output of each of said devices for recovering the video signals in the original frequency band, respective signal processing means coupled to said source and to the recovering means coupled to said further delaying means for providing the respective signal outputs inverted in polarity with respect to, and more restricted in the higher frequency range than, the delayed signal output of said first named delaying means, and means coupled to said signal processing means and to said first named signal delaying means for combining the video signal outputs thereof in predetermined magnitude to produce a compensated video signal for subsequent impression on an image reproducing device.

8. An arrangement for compensation in both horizontal and vertical picture directions in an interlaced scanning system comprising a first delay means having a delay time of one television line time, a second delay means having a delay time of one television line time in series with said first delay means, means for applying television signals as an input to said first delay means, means coupled to the output of said first delay means for deriving a main signal corresponding to a given element of the picture scene, means coupled to the input to said first delay means and the output of said second delay means for deriving signals corresponding to elements of scanning lines of the same field on each side of said given element, low pass filtering means coupled to said last named signal deriving means to develop secondary signals, and means coupled to said main signal deriving means and to said low pass filter means for combining the main signal and the secondary signals in predetermined manner to derive a compensated signal.

9. In a television system including, a source of video signals and in which said video signals are to be impressed subsequently upon an image-reproducing device in successive frames having interlaced parallel lines, apparatus to compensate for loss of detail in both the direction of said lines and a direction perpendicular to said lines, said apparatus comprising means coupled to said video signal source for delaying said signals for a time substantially equal to that required to scan one line, means coupled to said delaying means for attenuating the higher frequency components of said delayed signal, and a signal combining circuit coupled to said video signal source and to said attenuating means for subtracting said delayed signal from said underlayed signal to produce a compensated video-signal for subsequent impression upon said image-reproducing device.

References Cited in the file of this patent

UNITED STATES PATENTS

| | | |
|---|---|---|
| 2,226,459 | Bingley | Dec. 24, 1940 |
| 2,243,079 | Blumlein et al. | May 27, 1941 |
| 2,757,236 | Bedford | July 31, 1956 |
| 2,759,044 | Oliver | Aug. 14, 1956 |

OTHER REFERENCES

Journal of SMPTE, December 1955, pages 660–670, "Television Vertical Aperture Correction."